Oct. 16, 1962     E. F. KRUSBE     3,058,249

FISHING APPARATUS

Filed April 11, 1960

INVENTOR
EDWARD F. KRUSBE

BY *Roy E. Petherbridge*

ATTORNEY

United States Patent Office 3,058,249
Patented Oct. 16, 1962

3,058,249
FISHING APPARATUS
Edward F. Krusbe, 5739 S. Hermitage Ave.,
Chicago 36, Ill.
Filed Apr. 11, 1960, Ser. No. 21,490
2 Claims. (Cl. 43—16)

This invention relates to fishing apparatus and more particularly relates to apparatus for use with a fishing pole.

At the present time it is conventional to use a bobber or float when fishing with a pole and line, which bobber is attached to the line and floats on the surface of the water. When a fish strikes the hook the bobber is pulled down and indicates that a bite has occurred. Since the bobber contacts the surface of the water it is subject to being fouled by debris and other material present on the water. When fishing in deep water a float must be attached to the line a great distance from the hook and thus with a normal size pole the hook cannot be removed from the water by simply raising the pole and reeling in the line, since the bobber is stopped by the eyelet on the end of the pole.

Today ice fishing is a very popular sport and to use a conventional float or bobber in ice fishing presents additional problems. Either the ice will freeze solid around the bobber and prevent its proper operation, or the bobber will become encrusted with ice and slowly sink or settle. It is also common practice to use the "jiggling" technique of fishing wherein the fishing pole and therefore the line attached thereto is jiggled by the fisherman. Under such jiggling action, the conventional float is constantly in motion and it is therefore difficult to tell when a bite occurs. In summary, the conventional float has many shortcomings.

In the past devices have been devised to signal and indicate that a fish has struck, which eliminate the use of conventional floats. These prior devices have been characterized by having highly complex constructions and take the form of special purpose equipment so that they are limited in their use.

I have devised novel fishing apparatus which visually indicates a bite, that is simple and economical in construction and capable of use with a conventional fishing pole. The apparatus of my invention overcomes the difficulties heretofore encountered and in addition provides certain features and advantages not heretofore realized.

In summary, the apparatus of my invention comprises a base which is fixedly or releasably secured at the end of a conventional pole. An elongated arm is pivotally mounted within said base and has one end extending beyond the end of the pole. The other end which is of greater weight extends backwardly toward the butt end of the pole. An eyelet is provided on the forward end of the elongated arm and the fishing line is passed therethrough, with the line and fish hook hanging downwardly from the eyelet. An adjustable weight is provided on the rear end of the arm, which weight is positioned to balance the arm in a horizontal position for a given size of line and weight of fish hook, sinker, and lure, or bait. When a fish strikes the lure or bait and pulls on the line, the arm will rotate about the pivot and visually indicate the bite and at no time will the arm contact the water. In addition, an eyelet is provided on the rear end of the arm, through which the line is passed. The rear eyelet is spaced farther from the pivot point than the forward eyelet as will be hereinafter explained. This provides a self hooking action which automatically sets the hook in the fish's mouth as he takes the bait.

Accoring, an object of my invention is to provide apparatus which signals a fish bite, but which does not contact the water.

Another object is to provide apparatus for signaling a fish bite which is not secured to the fish line.

Another object of my invention is to provide apparatus for signaling a fish bite which can be attached to a conventional fishing pole. In addition the apparatus may be rendered inoperative and left in place without interfering with normal use of the pole.

A still further object of my invention is to provide apparatus for signaling a fish bite which may be releasably or permanently attached to a conventional fishing pole.

Another object of my invention to provide apparatus for a fishing pole which will cause self hooking of the fish.

A further object of my invention is to provide apparatus to visually indicate a fish bite, which is adjustable to accommodate various hooks, lures, sinkers and baits.

A still further object of my invention is to provide apparatus which visually indicates a fish bite and causes the hook to move for self hooking when a fish bites.

A still further object of my invention is to provide apparatus for visually indicating a fish bite which is simple and economical in construction and yet positive in operation.

Another object of my invention is to provide apparatus for visually indicating a fish bite and providing self hooking action which is usable with conventional fishing equipment and is simple and economical in construction.

These and other objects and advantages will become more readily apparent as this description proceeds and is read in conjunction with the accompanying drawing in which.

Figure 1:
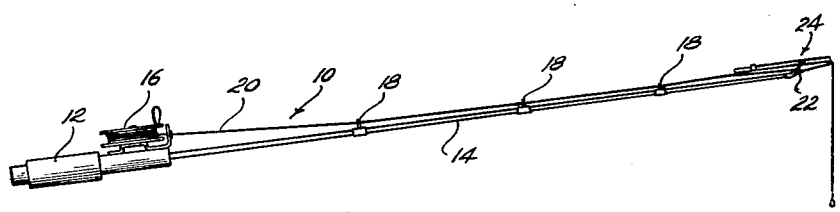
FIG. 1 is an eelvational view showing a conventional ice fishing pole and reel on which is provided the apparatus of my invention.

Referring to the drawings and first to FIG. 1, I have shown a conventional fishing pole designated 10. The pole comprises a handle 12, flexible shaft 14, and reel 16. Guide eyelet 18 are provided for line 20. The conventional tip 22 is provided with an eyelet through which line 20 passes. The apparatus of my invention, generally indicated at 24, is shown mounted in place at the tip end of pole 10.

Figure 3:
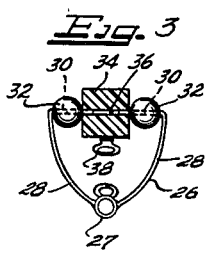
FIG. 3 is a sectional view taken on lines III—III of FIG. 2 showing the details of the base and pivot connection.
Figure 4:
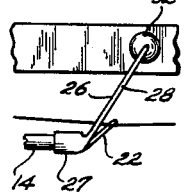
FIG. 4 is an enlarged detailed view in elevation showing the position of the base relative to the pole tip.

Referring now to FIGS. 2 thru 7, the details of the novel apparatus comprising my invention will now be explained. A base 26 is provided at the tip end of pole 10. Base 26 has a sleeve portion 27 that fits over the end of flexible pole section 14 and this sleeve is secured to the pole by conventional means. Spaced leg portions 28 extend upwardly and outwardly from sleeve 27 and their upper ends are bent inwardly at a right angle to provide bearing portions 30. Beads 32 are mounted on bearing portions 30. An arm 34 is disposed between beads 32. Arm 34 is provided with a bore 36, as best seen in FIG. 3 of the drawings. The ends of bearing portions 30 extend into bore 36. As shown in the drawings arm 34 is rectangular in cross section and is elongated. Bore 36 is spaced closer to the forward end of arm 34 than to the rear end of the arm. An eyelet 38 is provided on the forward end of arm 34 and a similar eyelet 40 is provided on the rear end thereof. An adjustable weight member 42 is provided on the rear end of arm 34.

Figure 5:
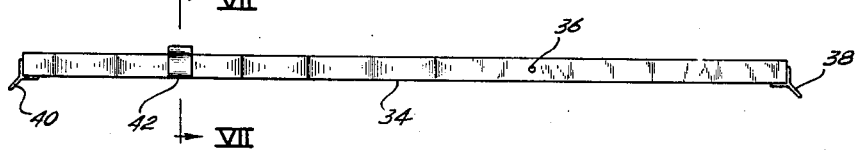
FIG. 5 is an enlarged side elevational view showing the details of construction of the pivotal arm.
Figure 6:
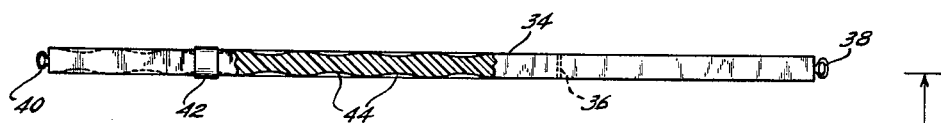
FIG. 6 is a plan view of the pivotal arm with parts broken away.
Figure 7:
FIG. 7 is an enlarged sectional view of the pivotal arm taken on line VII—VII of FIG. 5.

As seen in FIGS. 5, 6 and 7 of the drawings, a series of wave like depressions 44 are provided in the sides of arm 34. Weight member 42 has curved sides 46 of a shape corresponding with wave portions 44 and these sides of weight 42 fit within recesses 44. Weight 42 is preferably of resilient material.

Arm 34 is preferably made of fiber glass or other material having suitable strength, while base 26 is made of metal, with arms 28 being sufficiently resilient to allow removal of bearing portions 30 from arm 34, whereby arm 34 may be removed.

In the form of the invention shown in FIGS. 1 through 7, the apparatus of my invention is made an integral part of the fishing pole, except of course that arm 34 may be removed when one does not wish to use the apparatus of my invention. When arm 34 is removed the fishing pole can be used in its normal way.

To use the apparatus of my invention, the fisherman threads line 20 through eyelet 40, below arm 34, and through tip 22 of the pole. The line is then threaded through eyelet 38. It should be appreciated that eyelets 38 and 40 may be solid eyelets, but preferably are helically shaped wire eyelets so that a line at any place along its length may be placed therein without threading the end of the line through the eyelets. Thus the line does not have to be cut and the eyelets are connected without disturbing the lure, sinker or bait assembly. The line may be threaded whether arm 34 is in place on base 26, or whether it is separated therefrom. Assuming arm 34 has not yet been mounted on the base, the fisherman then mounts arm 34 in its operative position. To accomplish this, arms 28 are resiliently spread apart and arm 34 lowered between bearing portions 30 of the arms. When bearing portions 30 are in alignment with bore 36 of the arm, the legs 28 are released and the bearing portions enter bore 36. Thus arm 34 is pivotally mounted on bearing portions 30 and rotary movement of arm 34 about portions 30 is allowed by use of beads 32.

As will hereinafter appear, the balance of the arm 34 about pivot portions 30 will depend upon the weight of the bait, lure, sinkers, and hook. To achieve a proper balance for particular weights of these elements, adjustable weight 42 may be moved along arm 34 to an appropriate depression 44.

Figure 2:
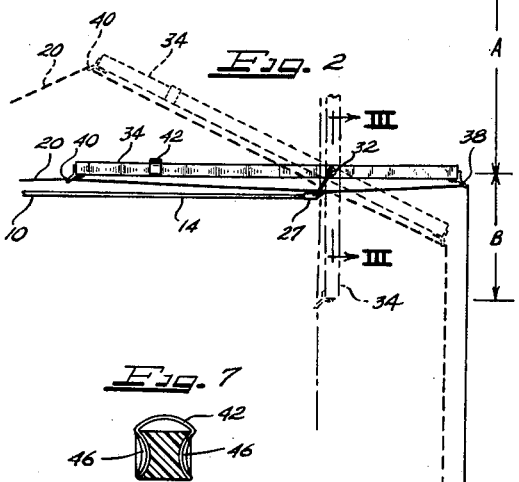
FIG. 2 is an enlarged detailed view of the right hand end of the fishing pole shown in FIG. 1 and showing, in particular, novel apparatus of my invention.

In FIG. 2, the apparatus of my invention is shown in solid lines in condition for operation. The apparatus of my invention is generally used in the so called "tight line" method of fishing wherein reel 16 is locked in place after the hook and bait are located at the appropriate depth. Thus, when, as viewed in FIG. 2, a fish strikes the hook, line 20 will not be pulled off reel 16, but will have a fixed length.

As a fish pulls on the hook, arm 34 will be free to rotate about the pivot portions and in FIG. 2, I have shown arm 34 in dotted lines rotated to a signaling position. Depending upon the pull exerted by the fish, arm 34 will rotate from its normal horizontal position to a position where the rear end of arm 34 is raised, thereby signaling that a pull is being exerted on the line. Since arm 34 is quite long in length, its movement will signal a bite even when the fisherman is a substantial distance away from the fish pole.

Another important feature of the apparatus of my invention is that it not only signals a bite, but also provides a self hooking action which impales the fish on the hook. This can be readily understood by referring to FIG. 2 of the drawings. Since the reel is locked and therefore line 20 has a fixed length, when arm 34 is pivoted to the dotted line position by a pull on the hook, the hook will actually move upwardly. This is due to the fact that the rear portion of arm 34 is longer than the forward portion of arm 34 and therefore eyelet 40 is spaced farther from the pivotal connection between the arm and base than is eyelet 38. This difference in radius causes eyelet 40 to raise further above its horizontal position than eyelet 38 drops below its horizontal position. The vertical distances that eyelets 38 and 40 move, are indicated at the right hand end of FIG. 2 respectively by the letters A and B. Since line 20 freely slides through eyelets 38 and 40, the result will be to cause the hook to move upwardly. It should therefore be appreciated that when a fish strikes the hook, the apparatus of my invention causes the hook to move in a direction which will impale the fish's mouth on the hook.

Figure 8:
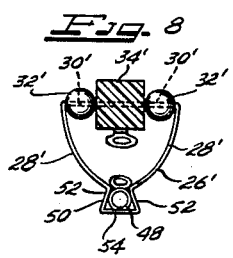
FIG. 8 is a sectional view showing another form of my invention wherein the base is detachably mountable on the fishing pole.
Figure 9:
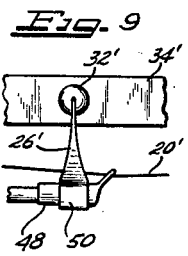
FIG. 9 is a side elevational view of the modified form of my invention shown in FIG. 8.

In FIGS. 1 through 7, I have shown a form of my invention wherein the base 26 is permanently secured on the fishing pole. In FIGS. 8 and 9, I have shown another form of my invention wherein base 26 is removably mounted on a fishing pole. As seen in these figures, the tip end of a fishing pole is indicated at 48. The line is indicated at 20'. The base 26' is formed of resilient metal and has upstanding legs 28' and inwardly turned bearing portions 30'. The lower portion of base 26' is in the form of a clamp, generally indicated at 50. Clamp 50 has inwardly inclined side portions 52 and a bottom portion 54. Since clamp 50 is of resilient material, the base 26' may be mounted on the tip of the fishing pole by placing the pole above the recess of clamp 50 and snapping the pole tip into the pocket formed by clamp 50. The base and pole will thereby be firmly secured together. The operation of the apparatus shown in FIGS. 8 and 9 is similar to that previously described.

From the foregoing description, some of the important advantages of the apparatus of my invention should now be apparent. It will be noted that the signaling apparatus never contacts the surface of the water as is the case with the conventional float. As previously explained, the conventional floats are continually becoming fouled by material on the surface of the water and in particular in ice fishing serious disadvantages result from conventional floats. None of the elements of my novel apparatus contact the water and these problems are completely eliminated.

Since the signaling apparatus of my invention is not secured to line 20, another important advantage results. With conventional floats, if one were fishing in deep water, for example, twenty of thirty feet, the conventional float must be secured to the line approximately 20 or 30 feet from the hook end of the line. This makes it almost impossible to remove the hook for re-baiting from the water by simply raising the pole and it is not possible to do it by reeling in the line since the conventional float will stop reeling action when the float reaches the end of the pole. In these conditions it is necessary to pull up the line hand over hand. With the apparatus of my invention, the line may be pulled in simply by operating reel 16 since the line passes freely through eyelets 38 and 40 and pole tip 22.

It has become an accepted practice to use a "jiggling" technique when still fishing. In this technique, the fisherman gently shakes or jiggles the pole so that this motion is transmitted to the bait which attracts fish. With the conventional float, such jiggling makes it difficult to determine when a fish has struck the bait, because of the constant movement of the bobber. With the apparatus of my invention, jiggling of the pole does not cause arm 34 to rotate about its pivotal axis and thereby no false visual indications are given.

In the previous description, I have described the self-hooking action of the apparatus of my invention, which has proven most advantageous. It should however be appreciated that the apparatus of my invention may be used as a signaling apparatus alone. For such operation, line 20 is not passed through eyelet 40, carried by the rear end of arm 34, thus line 20 passes only through pole tip 22 and eyelet 38 carried by the forward end of arm 34. When a fish strikes, arm 34 will be rotated to its signaling position, but since the line does not engage eyelet 40, no self hooking upward movement of the hook will be manifested and the hook will move downwardly.

The purpose of adjustable weight 42 is to control the balance of arm 34 and thereby preset the amount of weight and force necessary to rotate arm 34 to its signaling position. If weight 42 is moved in a direction away from the pivotal axis of arm 34, the amount of weight and force required to rotate the arm will be increased and correspondingly when the weight is moved toward the pivotal axis, the weight and force required will be less. Of course for some conditions no weight is needed and thus weight 42 is removed from arm 34. More than one weight 42 may be used if desired and in practice, I have found it expedient to provide two or more weights 42 each having a different weight.

In addition to, or in the place of using a weight to control the amount of weight and force required to rotate arm 34, it may be advisable to provide a series of bores 36 spaced along the length of arm 34. In the drawings, for sake of convenience, I have shown only one such bore 36, but it should be appreciated that more of these bores may be readily supplied.

As previously explained in the form of the invention shown in FIGS. 1 through 7, the arm 34 may be readily removed but base 26 is permanently secured to the tip of the fish pole and may be formed as an integral part of the original pole. By removal of arm 34, the pole may be used in all normal and conventional ways of fishing and base 26 will in no way interfere. If it is desired to make the apparatus of my invention applicable to existing fishing poles, the form of the invention shown in FIGS. 8 and 9 of the drawings would be used.

Another important feature of my invention is that my apparatus can be placed in operation at any time by hooking the line in the eyelets without cutting the line and without the lure or bait and sinker assembly being disassembled. Also the apparatus can at any time be disconnected by simply removing the line from the eyelets and the pole used in any usual way. Importantly the apparatus of my invention in no way interferes with such use.

Having now described my invention in detail as required by the patent laws, it should readily be appreciated that I have provided apparatus which is simple and economical in construction and yet positive in operation. The apparatus has proven successful in use and readily meets the various objects and advantages heretofore described.

It should be understood that various changes and modifications may be made in the apparatus described herein without departing from the scope of my invention which is defined in the following claims.

I claim:

1. In apparatus for use on a fishing pole with a line, said pole having a tip eyelet with the line therethrough, a base connected to said pole near said tip thereof, spaced legs on said base extending away from said pole, bearing portions provided on said spaced legs, an elongated arm disposed between said spaced legs and extending along the length of and above said pole, said arm being pivotally mounted on said bearing portions at a point intermediate its length, said arm having a forward portion extending beyond the end of said pole and a rearward portion extending rearwardly from the tip end of said pole, said legs being resiliently deformable away from each other whereby said arm may be removably mounted between said legs, eyelet means carried by said forward portion of said arm, said line being threaded through said eyelet means whereby said arm is rotated about said bearing portions by application of force to said line, which force is transmitted to said arm through said eyelet means, and second eyelet means provided on the rear portion of said arm, said line being threaded through said second eyelet means, said second eyelet means being spaced farther from said bearing portions than said first eyelet means whereby a pull on said line will cause said arm to rotate, but rotation of said arm will cause said line to move in a direction opposite to that of the pull.

2. In apparatus for use on a fishing pole with a line, said pole having a tip eyelet with the line therethrough, a base carried by said pole near said tip thereof, bearing portions on said base, an arm pivotally mounted on said bearing portions above said tip and extending parallel to said pole, eyelet means on said arm, said arm comprising an elongated member having a forward portion which extends away from said bearing portions beyond said tip of said pole and having a rearward portion which extends away from said bearing portions rearwardly along said pole, said rearward portion being of greater weight than said forward portion, said eyelet means including a first eyelet provided on the forward end of said arm, whereby said arm is pivoted by a pull on said line, and said eyelet means including a second eyelet secured to said rearward-extending portion of said arm, said line being threaded through both of said eyelets, and said rearward-extending portion of said arm being longer than said forward-extending portion of said arm.

References Cited in the file of this patent

UNITED STATES PATENTS

| | | |
|---|---|---|
| 2,283,233 | Shafer | May 19, 1942 |
| 2,496,090 | Grohs | Jan. 31, 1950 |
| 2,680,925 | Grunwald et al. | June 15, 1954 |
| 2,714,270 | Premo | Aug. 2, 1955 |
| 2,752,716 | Porter | July 3, 1956 |

FOREIGN PATENTS

| | | |
|---|---|---|
| 628,415 | France | June 27, 1927 |